United States Patent [19]

Nakagawa et al.

[11] Patent Number: 5,239,028
[45] Date of Patent: Aug. 24, 1993

[54] ULTRAVIOLET-STABLE COPOLYMER, PROCESS FOR PRODUCING THE SAME, AND COATING COMPOSITION CONTAINING THE SAME

[75] Inventors: Hiroo Nakagawa, Ibaraki; Tatsuhito Matsuda, Kobe; Masato Adachi; Mitsuo Nakazaki, both of Takatsuki; Takahiro Aoyama, Osaka; Shoji Hashiguchi, Suita; Masaya Yoshida, Takatsuki, all of Japan

[73] Assignee: Nippon Shokubai, Co., Osaka, Japan

[21] Appl. No.: 337,174

[22] Filed: Apr. 12, 1989

[30] Foreign Application Priority Data

Apr. 12, 1988 [JP] Japan .................................. 63-88280

[51] Int. Cl.⁵ .................... C08F 226/06; C08F 220/10
[52] U.S. Cl. ..................................... 526/265; 526/308
[58] Field of Search ........................ 526/265, 308, 309

[56] References Cited

U.S. PATENT DOCUMENTS

| | | | |
|---|---|---|---|
| 2,511,880 | 6/1950 | Rehberg et al. | 526/309 |
| 3,238,167 | 3/1966 | Wolff et al. | 526/308 |
| 3,705,166 | 12/1972 | Murayama et al. | 260/293.86 |
| 4,058,508 | 11/1977 | Naarmann et al. | 526/309 |

FOREIGN PATENT DOCUMENTS

| | | | |
|---|---|---|---|
| 1803 | 5/1979 | European Pat. Off. . | |
| 10518 | 4/1980 | European Pat. Off. . | |
| 90558 | 5/1983 | European Pat. Off. | 526/308 |
| 771336 | 1/1955 | United Kingdom | 526/309 |

*Primary Examiner*—Joseph L. Schofer
*Assistant Examiner*—Wu C. Cheng
*Attorney, Agent, or Firm*—Oblon, Spivak, McClelland, Maier & Neustadt

[57] ABSTRACT

Provided herein are a copolymer obtained by copolymerizing at least an ultraviolet-stable polymerizable monomer and a cycloalkyl group-containing polymerizable monomer, a process for producing said copolymer, and a coating composition containing said copolymer. The copolymers retains outstanding weather resistance over a long period of time owing to the multiplicated effect of an ultraviolet-stable monomer and a cycloalkyl group-containing polymerizable monomer, and the coating composition containing the copolymer forms a coating film having superior gloss, buildability, solvent resistance, and chemical resistance.

18 Claims, No Drawings

ULTRAVIOLET-STABLE COPOLYMER, PROCESS FOR PRODUCING THE SAME, AND COATING COMPOSITION CONTAINING THE SAME

BACKGROUND OF THE INVENTION

1. Field of the Invention

The present invention relates to a highly weather-resistant copolymer, a process for producing the same, and a coating composition made from the same. More particularly, it is concerned with a copolymer useful as a coating material, ink, adhesive, fiber treatment, and the like, and also with a coating composition made from said copolymer which forms a coating film having not only longlasting good weather resistance but also good drying property, good gloss, good buildability, and good solvent resistance.

2. Description of the Prior Art

Among important coating materials is acrylic resin and methacrylic resin (which are collectively referred to as (meth)acrylic resin hereinafter). The typical uses of (meth)acrylic resin in the coating area are as lacquers and curable coating materials. Lacquers are commonly used for the coating of building materials, wood products, and plastics products because of their easy usage. All required for lacquer coating is to apply a lacquer as such to a substrate and let it dry. Curable coating materials are a composition composed of an acrylic polyol and a crosslinking agent. The acrylic polyol is produced by copolymerizing hydroxyl group-containing monomers such as hydroxyethyl (meth)acrylate with other monomers. The crosslinking agent is a polyisocyanate compound or aminoplast resin. The curable compositions are either of room temperature-curable type or thermosetting type. The coating materials based on the curable resin composition are used for automobiles, home appliances, steel machines, building materials and so on because of their better durability compared with the above-mentioned lacquers.

The coating resin compositions used in the application areas where the coating film with a good-looking appearance is required are usually based on a copolymer containing 30-60 wt % of aromatic curable monomer to impart good gloss, buildability, solvent resistance, and chemical resistance. Unfortunately, the resin composition based on a copolymer containing a large amount of aromatic monomer provides a coating film which is poor in weather resistance, and consequently it is incorporated with an ultraviolet stabilizer or ultraviolet absorber so that it can be put to practical use, especially under sever condition.

There has recently been proposed the use of an ultraviolet absorbing vinyl monomer (as a comonomer) in place of the externally added ultraviolet stabilizer or absorber. (See Japanese Patent Publication No. 42751/1986.) This new technology is effective in improving the weather resistance of the composition to some extent, but is not satisfactory when it comes to long term weather resistance.

Unfortunately, the coating resin composition having the improved weather resistance resulting from the incorporation of an ultraviolet stabilizer or absorber in the absence of aromatic vinyl monomer or by in the absence of aromatic vinyl monomer the copolymerization with an ultraviolet absorbing monomer does not necessarily provide a coating film with good gloss, buildability, and appearance.

BRIEF SUMMARY OF THE INVENTION

It is an object of the present invention to provide an ultraviolet-stable copolymer which useful for paint, ink, adhesive agent, fiber treating agent, paper treating agent having outstanding long-term weather resistance.

It is another object of the present invention to provide a process for producing said copolymer.

It is further another object of the present invention to provide a coating resin composition containing said copolymer.

The coating resin composition pertaining to the present invention can be used in a variety of application areas including lacquer, coating material (such as two-pack urethane paint, room-temperature curable paint, and thermosetting paint) where good weather resistance is required. In addition, the coating resin composition forms a coating film which exhibits outstanding weather resistance over a long period of time without sacrificing drying property, hardness, gloss, buildability, solvent resistance, and chemical resistance. Moreover, the coating resin composition forms a weather-resistant coating film which retains gloss over a long period of time and has improved discoloration resistance, cracking resistance, and blister resistance.

These and other objects of the invention will become more apparent in the detailed description and examples which follow.

DETAILED DESCRIPTION OF THE INVENTION

The copolymer of the present invention is obtained by copolymerizing an ultraviolet-stable polymerizable monomer (a) and a cycloalkyl group-containing polymerizable monomer (b). Upon curing with a crosslinking agent, the copolymer forms a coating film having superior weather resistance, gloss retention, buildability, solvent resistance, chemical resistance, crack resistance, and blister resistance.

The ultraviolet-stable polymerizable monomer (a) is essential for the copolymer to form a coating film having superior weather resistance. It is typically a compound composed of a hindered piperidinyl group and at least one polymerizable unsaturated group as represented by the general formula (I) below.

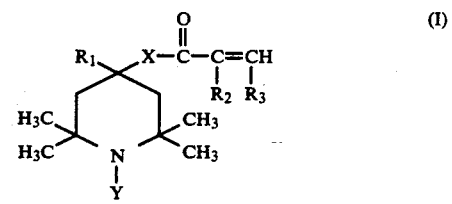

(I)

where $R_1$ denotes a hydrogen atom or cyano group; $R_2$ and $R_3$ independently denote a hydrogen atom or alkyl group having 1-2 carbon atoms; X denotes an imino group or oxygen atom; and Y denotes a hydrogen atom, alkyl group having 1-18 carbon atoms, or

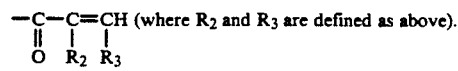

(where $R_2$ and $R_3$ are defined as above).

On the other hand, the cycloalkyl group-containing polymerizable monomer (b) is an indispensable component for the copolymer in the coating composition which provides a coating film having outstanding film hardness, gloss, buildability, solvent resistance, and weather resistance. (The monomer (a) and the monomer (b) produce a synergistic effect in improving the long-term weather resistance.) The monomer (b) is typically represented by the general formula (II) below.

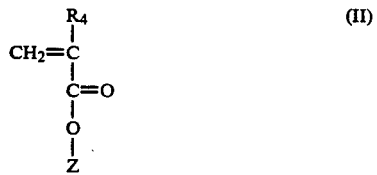

where $R_4$ denotes a hydrogen atom or alkyl group having 1-2 carbon atoms; and Z denotes a cycloalkyl group which may have a substituent group.

Examples of the alkyl groups having 1-2 carbon atoms represented by $R_2$, $R_3$, and $R_4$ in the above formulas include methyl and ethyl. Examples of the alkyl groups having 1-18 carbon atoms represented by Y in the above formula include straight-chain or branched-chain hydrocarbon residues such as methyl, ethyl, propyl, isopropyl, butyl, isobutyl, t-butyl, pentyl, hexyl, heptyl, octyl, nonyl, decyl, undecyl, dodecyl, tridecyl, tetradecyl, pentadecyl, hexadecyl, heptadecyl, and octadecyl. Examples of the cycloalkyl group represented by Z in the above formula include monocyclic saturated hydrocarbon residues such as cyclopentyl, cyclohexyl, and cyclododencyl. These cycloalkyl groups may have a substituent group such as alkyl group, having 1-6 carbon atoms. Examples of the above alkyl group include methyl, ethyl, propyl, isopropyl, butyl, isobutyl, t-butyl, pentyl, hexyl and heptyl.

Examples of the ultaviolet-stable polymerizable monomer (a) include
4- (meth)acryloyloxy-2,2,6,6-tetramethylpiperidine,
4-(meth)acryloylamino-2,2,6,6-tetramethylpiperidine,
4-(met)acryloyloxy-1,2,2,6,6-pentamethylpiperidine,
4-(meth)acryloylamino-1,2,2,6,6-pentamethylpiperidine,
4-cyano 4-(meth)acryloylamino-2,2,6,6-tetramethylpiperidine,
1-(meth)acryloyl-4-(meth)acryloylamino-2,2,6,6-tetramethylpiperidine,
1-(meth)acryloyl-4-cyano-4-(meth)acryloylamino-2,2,6,6-tetramethylpiperidine,
4-crotonoyloxy-2,2,6,6-tetramethylpiperidine,
4-crotonoylamino-2,2,6,6-tetramethylpiperidine, and
1-crotonoyl-4-crotonoyloxy-2,2,6,6-tetramethylpiperidine.
These monomers may be used alone or in combination with one another.

Examples of the cycloalkyl group-containing polymerizable monomer (b) include cyclohexyl (meth)acrylate, methylcyclohexyl (meth)acrylate, and tert-butylcyclohexyl (meth)acrylate. These monomers may be used alone or in combination with one another.

The ultraviolet-stable polymerizable monomer (a) and the cycloalkyl group-containing polymerizable monomer (b) provide a copolymer which is by far superior in weather resistance to a polymer obtained from the monomer (a) or (b) alone. In other words, the monomers (a) and (b) produce a dramatic synergistic effect, which makes the copolymer comparable to fluoroplastics in weather resistance even when the copolymer contains acrylic monomers as the major constituent.

The monomers (a) and (b) may be used in any ratio to produce the copolymer from them. Usually, the monomer (a) should be used in an amount of 0.1 to 95.0 wt %, and the monomer (b) should be used in an amount of 99.9 to 5.0 wt %. With the monomer (a) in an amount less than 0.1 wt %, the resulting copolymer lacks sufficient weather resistance and has drying property and leveling property which are incompatible with each other. With the monomer (a) in an amount more than 95.0 wt %, the resulting copolymer contains less than 5.0 wt % of the monomer (b) and hence gives a coating composition which forms a coating film having poor gloss, buildability, and appearance. Thus the monomer (a) should be used in an amount of 0.2-50 wt %, preferably 0.5-10 wt %; and the monomer (b) should be used in an amount of 99.8-50 wt %, preferably 99.5-90 wt %. The monomer (a) wherein Y is illustrated as

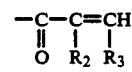

is preferably applied for emulsion polymerization and suspension polymerization.

According to the present invention, the monomers (a) and (b) may be used in combination with a third polymerizable monomer (c) to form the copolymer. Examples of the monomer (c) include the following.
Alkyl ester of (meth)acrylic acid such as methyl (meth)acrylate, ethyl (meth)acrylate, propyl (meth)-acrylate, isopropyl (meth)acrylate, butyl (meth)-acrylate, isobutyl (meth)acrylate, tert-butyl (meth)-acrylate, 2-ethylhexyl (meth)acrylate, lauryl (meth)-acrylate, and stearyl (meth)acrylate.
Epoxy group-containing polymerizable monomer such as glycidyl (meth)acrylate.
Nitrogen-containing polymerizable monomer such as (meth)acrylamide, N,N'-dimethylaminoethyl (meth)-acrylate, vinylpyridine, and vinylimidazole.
Halogen-containing polymerizable monomer such as vinyl chloride and vinylidene chloride.
Aromatic polymerizable monomer such as α-methylstyrene and vinyltoluene.
Vinyl ester such as vinyl acetate.
Vinyl ether.
Polymerizable cyan compound such as (meth)acrylonitrile.
Carboxyl group-containing polymerizable monomer such as (meth)acrylic acid, crotonic acid, itaconic acid, maleic acid, and maleic anhydride.
Sulfonic group-containing polymerizable monomer such as vinylsulfonic acid, styrenesulfonic acid, and sulfoethyl (meth)acrylate.
Acid phosphate ester-based polymerizable monomer such as 2-(meth)acryloyloxyethyl acid phosphate, 2-(meth)-acryloyloxypropyl acid phosphate, 2-(meth)acryloloxy-3-chloropropyl acid phosphate, and 2-methacryloyloxyethylphenyl phosphate.
Hydroxyl group-containing polymerizable monomer such as hydroxyethyl (meth)acrylate, hydroxypropyl (meth)-acrylate, caprolactone-modified hydroxy (meth)acrylate ("Placsel FM" made by Daisel Chemical Industries Co., Ltd.), and mono(meth)acrylate of polyester diol obtained from phthalic acid and propylene glycol.
Optional ultraviolet-absorbing monomer such as 2-hydroxy-4-(3-(meth)acryloxy-2-hydroxypropoxy)- benzophenone and 2,2'-dihydroxy-4-(3-(meth)acryloxy-2-hydroxypropoxy)benzophenone, which are obtained by the reaction of 2,4-dihydroxybenzophenone or 2,2',4-trihydroxybenzophenone with glycidyl (meth)acrylate.

The above-mentioned monomers (c) may be used alone or in combination with one another.

The monomer (c) should be used in such an amount that the copolymer containing it has no adverse effect on the resulting coating resin composition. An adequate amount may be less than 94.9 wt % of the total amount of the copolymer. When used in an amount of 0.1 wt % and over, preferably 2 wt %, and more preferably 5 w %, the monomer (c) gives the copolymer for the coating resin composition which forms a coating film having outstanding weather resistance, gloss, and buildability. Particularly prefer able among the above-mentioned examples of the monomer (c) are tert-butyl (meth)acrylate and stearyl (meth)acrylate. It should be used in an amount less than 94.7 wt %, preferably less than 50 wt %, and more preferably less than 30 wt %. An excessive amount of monomer (C) reduce the effect of the present invention.

In the case where the polymerizable monomer (c) is a hydroxyl group-containing one selected from the abovementioned examples, it should be used in such an amount that the resulting copolymer has a hydroxyl value of 0.1 to 200 mg KOH/g. When used in an amount equivalent to 0.1 mg KOH/g and over, preferably 10 mg KOH/g and over, and more preferably 20 mg KOH/g and over, it makes the resulting copolymer hydrophilic and crosslinkable. The hydrophilic nature is important when the copolymer is used as an acrylic lacquer or acrylic emulsion. The crosslinkable copolymer in combination with a crosslinking agent form a curable coating resin composition. It should be used in an amount equivalent 200 mg KOH/g and under, preferably 150 mg KOH/g and under, and more preferably 120 mg KOH/g and under. When used in an excessive amount, it will cause lowering the satability at the polymerization reaction and water stability.

In the case where the polymerizable monomer (c) is one containing an acid functional group (such as carboxyl group and sulfonic group) selected from the above-mentioned examples, it should be used in such an amount that the resulting copolymer has a acid value of 0.1 to 100 mg KOH/g. When used in an amount equivalent to 0.1 mg KOH/g and over, it makes he resulting copolymer hydrophilic, as in the case of hydroxyl group-containing one. In addition, it is useful as an internal catalyst for the range between 1 mg KOH/g and 15 mg KOH/g in the case where the copolymer of the invention is used for a thermosetting coating resin composition. It should be used in an amount equivalent to 100 mg KOH/g and under, preferably 80 mg KOH/g and under, and more preferably 60 mg KOH/g and under. When used in an excessive amount, it will cause the same inconvenience.

In the case where the polymerizable monomer (c) is an aromatic group-containing unsaturated monomer selected from the above-mentioned examples imparts chemical resistance to the resulting copolymer. However, it has an adverse effect of the weather resistance when used in an excess amount; therefore, it should be used in an amount of 30 wt % and under, preferably 20 wt % and under, and more preferably 15 wt % and under.

The above-mentioned monomers (a) and (b) and optional monomer (c) constitute a copolymer composed of the repeating units (—A—) derived from the monomer (a), the repeating units (—B—) derived from the monomer (b), and, in the case where the optional monomer (c) is used, the repeating units (—C—) derived from the monomer (c) which are arranged in an arbitrary order. The copolymer may be a random copolymer, block copolymer, or graft copolymer depending on how the repeating units are arranged The foregoing applies in the case where the repeating units (—A—), (—B—), and (—C—) are derived from the monomers (a), (b), and (c) of single species, respectively. If each of the monomers (a), (b), and (c) is composed of two or more compounds, then the repeating units would be represented by $(—A_1—), (—A_2—), (—A_3—), \ldots, (—B_1—), (—B_1—), (—B_2—), (—B_3—), \ldots,$ and $(—C_1—), (—C_2—), (—C_3—), \ldots$ The typical copolymer of the present invention, therefore, is composed of the repeating units (—A—) and (—B—) represented by the formulas below.

Repeating unit (—A—):

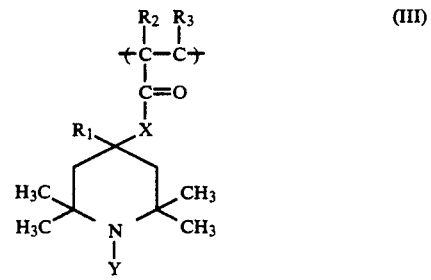

(III)

where $R_1, R_2, R_3$, X and Y are defined as in the formula (I) above.

Repeating unit (—B—):

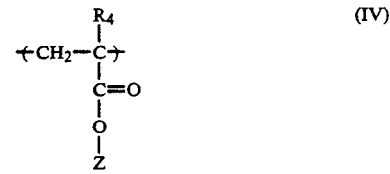

(IV)

where $R_4$ and Z are defined as in the formula (II) above.

According to another embodiment of the present invention, the copolymer contains the repeating unit (—C—) which is arbitrarily arranged in the polymer. Examples of the repeating unit (—C—) are shown below.

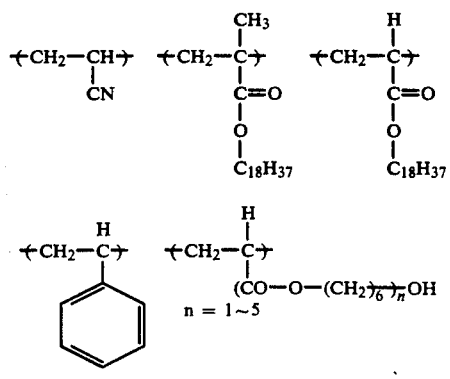

-continued

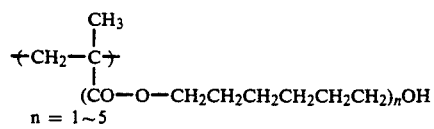
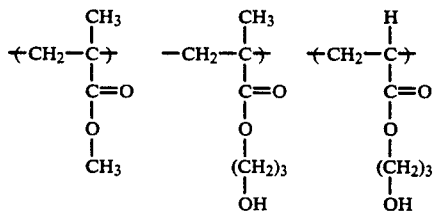
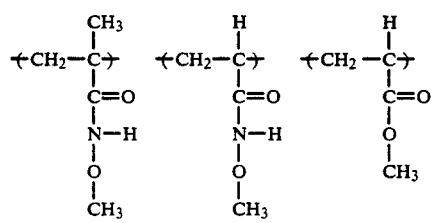
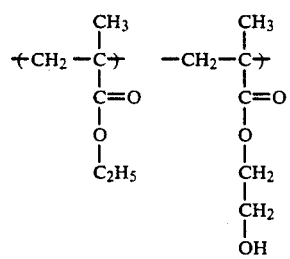
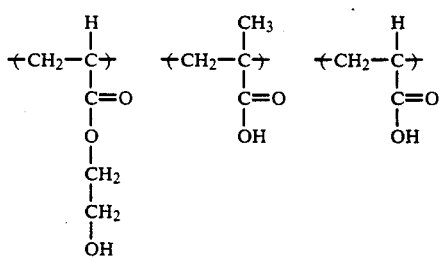
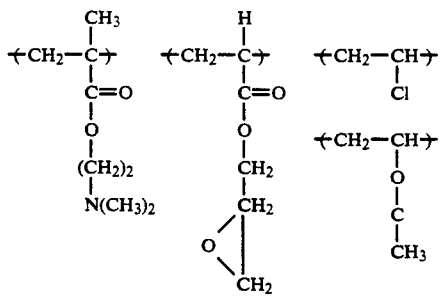
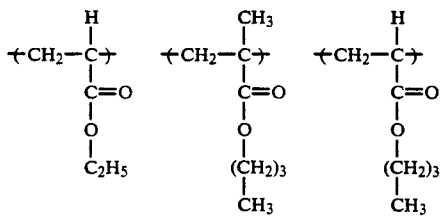

-continued

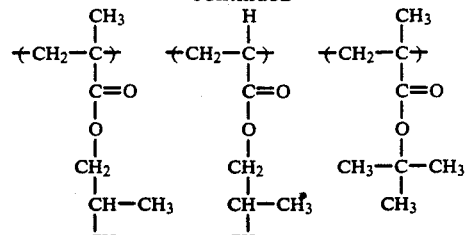
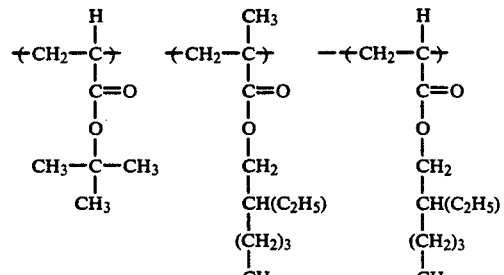
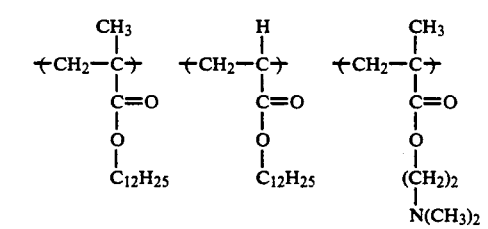

The copolymer of the present invention, which is referred to as copolymer (P) hereinafter, can be prepared by any known polymerization process (such as solution polymerization, emulsion polymerization, suspension polymerization, and bulk polymerization) from a polymerizable monomer mixture composed of the ultraviolet-stable polymerizable monomer (a) and the cycloalkyl group-contanining monomer (b) as the essential constituents and the optional polymerizable monomer (c) properly selected according to the intended use.

The solvent that can be used for solution polymerization includes aromatic hydrocarbons such as toluene and xylene; acetic esters such as ethyl acetate and butyl acetate; ketones such as methyl ethyl ketone and methyl isobutyl ketone; aliphatic alcohols such as isopropanol, n-butanol, and iso-butanol; and alkylene glycol monoalkyl ether such as ethylene glycol monomethyl ether, ethylene glycol monoethyl ether, diethylene glycol monoethyl ether. These solvents may be used alone or in combination with one another. In the case where the copolymer (P) is formulated with a polyisocyanate compound, it is not desirable to use such solvents as aliphatic alcohols, alkylene glycol monoalkyl ethers, and water, which are reactive to the isocyanate group.

The solution polymerization may be carried out by the aid of an ordinary radical polymerization initiator such as 2,2'- azobisisobutyronitrile, benzoyl peroxide, and di-tertbutyl peroxide, which is used in an amount of 0.1 to 10 wt % of the total amount of the polymerizable monomer. The polymerization temperature should be in the range of room temperature to 200° C., preferably 40° C. to 140° C. For the purpose of molecular weight control, the polymerization system may be provided with a chain transfer agent or molecular weight modifier such as lauryl mercaptan, 2-mercapto ethanol, carbon tetrachloride, and carbon tetrabromide. The solution polymerization performed in this manner should yield a copolymer having molecular weight of 5,000-300,000, preferably 8,000-100,000.

The copolymer (P) of this invention obtained as mentioned above may be neutralized with a basic compound, if necessary, in the case where it is used in the form of aqueous solution or aqueous dispersion. The basic compound includes, for example, ammonia, triethylamine, morpholine, and sodium hydroxide.

The emulsion polymerization may be carried out by the aid of a polymerization initiator which includes persulfates (such as ammonium persulfate, sodium persulfate, and potassium persulfate), organic peroxide (such as tert-butylhydroperoxide, benzoyl peroxide, and peracetic acid), radical-forming azo compound (such as 2,2'-azobisisobutyronitrile, and 2,2'-azobis(2-methylpropionamidine)dihydrochloride), and hydrogen peroxide. These initiators may be used in combination with a reducing agent (such as sodium hydrogen sulfite and L-ascorbic acid) to form a redox catalyst. Also, the emulsion polymerization may be carried out by the aid of an emulsifier of any kind selected from anionic surface active agents, nonionic surface active agents, cationic surface active agents, ampholytic surface active agents, and polymeric surface active agents. In some cases, polymerization in the absence of emulsifier may be possible to perform.

Examples of the anionic surface active agent include alkyl metal alkyl sulfates (such as sodium dodecyl sulfate and potassium dodecyl sulfate), ammonium alkyl sulfates (such as ammonium dodecyl sulfate), alkyl sulfonates (such as sodium dodecyl polyglycol ether sulfate, sodium sulforicinoate, alkali metal salt of sulfonated paraffin, and ammonium salt of sulfonated paraffin), fatty acid salts (such as sodium laurate, triethanolamine oleate, and triethanolamine abietate), alkyl aryl sulfonates (such as sodium dodecyl benzene sulfonate, and alkali metal sulfate of alkali phenol hydroxyethylene), higher-alkyl naphthalenesulfonates, naphthalenesulfonic acid-formalin condensate, dialkylsulfosuccinates, polyoxyethylene alkyl sulfates, and polyoxyethylene alkyl aryl sulfates.

Examples of the nonionic surface active agent include polyoxyethylene alkyl ether, polyoxyethylene alkyl aryl ether, sorbitan fatty acid ester, polyoxyethylene sorbitan fatty acid ester, fatty acid monoglyceride (such as glycerol monolaurate), poly(oxyethylene-oxypropylene) copolymer, and condensate of ethylene oxide and aliphatic amine, amide, or acid.

Examples of the polymeric surface active agent include polyvinyl alcohol, sodium polymethacrylate, potassium polymethacrylate, ammonium polymethacrylate, polyhydroxyethyl (meth)acrylate, polyhydroxypropyl (meth)acrylate, and copolymers composed of two or more than two kinds of the polymerizable monomers as the constitutional units of said polymers (and other monomers). Additional examples include crown ethers called phase transfer catalyst which exhibits the surface activity.

The emulsion polymerization should be carried out at a temperature in the range of room temperature to 100° C., preferably 40° C. to 95° C. As in the case of solution polymerization mentioned above, the polymerization system may be provided with a chain transfer agent such as lauryl mercaptan for the purpose of molecular weight control. If necessary, the copolymer (P) of this invention obtained as mentioned above may be neutralized with a basic compound such as ammonia, triethylamine, morpholine, and sodium hydroxide.

The emulsion polymerization usually yields a copolymer having a weight-average molecular weight of 300,000 to 2,000,000.

The copolymer (P) obtained as mentioned above is used as a coating composition in the form of solution, dispersion, or powder, preferably in the liquid form prepared by dissolution or dispersion in an organic solvent and/or water. The thus obtained coating composition can be made into a curable coating composition by incorporation with a polyisocyanate compound as a crosslinking agent.

Liquid substance obtained by dissolving or suspending the copolymer (P) in solvent may be used as water soluble acryl lacquer, acryl emulsion, and so on.

Examples of the above liquid substance containing polyisocyanate compound include cresol-blocked hexamethylene diisocyanate, trilene diisocyanate, xylylene diisocyanate, and isophorone diisocyanate, and n-butanol-blocked xylylene diisocyanate. They may be used alone or in combination with one another. The polyisocyanate compound should preferably be used in an amount of 5 to 100 parts by weight for 100 parts by weight of the copolymer (P), although there is no specific limitation.

The above liquid substance of the present invention may be incorporated with an aminoplast resin as a crosslinking agent to form a curable coating composition in the form of either solvent solution or aqueous solution. Examples of the aminoplast resin include methyl-etherified melamine resin, butyl-etherified melamine resin, butyletherified benzoguanamine resin, and butyl-etherified cyclohexane carboguanamine resin, and water-soluble products thereof. They may be used alone or in combination with one another. The aminoplast resin should preferably be used in an amount of 5 to 70 parts by weight for 100 parts by weight of the copolymer (P), although there is no specific limitation.

The coating composition of the present invention may be incorporated with paint additives such as curing catalyst to accelerate the reaction, solvent (organic solvent and/or water), filler, leveling agent, dispersing agent, plasticizer, stabilizer, dye, and pigment.

The coating composition of the present invention exhibits good weather resistance over a long period of time because it is produced from polymerizable monomers of specific composition. Accordingly, it may be used as a clear lacquer. Further it may be used as a colored paint by dispersing inorganic or organic pigments according to a known pigment dispersing method. In addition, it may also be used as a curable coating material upon incorporation with a crosslinking agent such as polyisocyanate compound or aminoplast resin. It is particularly suitable for use as a curable coating material incorporated with a polyisocyanate compound or aminoplast resin. The coating material produced from the copolymer of the present invention may be applied to metal products, plastic products, and wood products by spray coating, roller coating, or brush coating, to form a coating film having outstanding weather resistance. The coating composition containing the copolymer of the present invention provides a coating film having good weather resistance over a long period of time as well as good gloss, buildability, and solvent resistance. In addition, it has good workability. Owing to these characteristic properties, it will find use in a broad application areas including large structures, automobiles, and wood products.

EXAMPLES

The invention will be described in more detail with reference to the following examples and comparative examples, in which quantities are expressed as parts by weight or wt %, unless otherwise indicated.

Example 1

In a four-neck flask equipped with a stirrer, thermometer, cooler, and nitrogen gas inlet were placed 25 parts of toluene and 25 parts of butyl alcohol under a nitrogen stream. With the system heated to 80° C., a polymerizable monomer component composed of 3 parts of 4-methacryloyloxy-1,2,2,6,6-pentamethylpiperidine, 47 parts of cyclohexylmethacrylate, and 0.3 parts of azobisisobutyronitrile was added dropwise over 2 hours. The system was kept at 80° C. for 4 hours. Thus there was obtained a solution containing 50.1% of non-volatile matter or the copolymer of the present invention which has a weight-average molecular weight of 100,000. This solution is designated as the copolymer solution (1). Examples 2 to 6 and Comparative Examples 1 to 6

The same procedure as in Example 1 was repeated to prepare copolymer solutions (2) to (6) and comparative copolymer solutions (1) to (6), except that the polymerizable monomer, solvent, polymerization initiator, and polymerization temperature were changed as shown in Table 1.

TABLE 1

| Example No. | 2 | 3 | 4 | 5 | 6 |
|---|---|---|---|---|---|
| Copolymer solution | (2) | (3) | (4) | (5) | (6) |
| 4-Methacryloyloxy-2,2,6,6,-tetramethyl piperidine | — | — | 1.5 | — | 1.8 |
| 4-Methacryloyloxy-1,2,2,6,6-pentamethyl piperidine | 40 | 5 | — | 15 | — |
| Cyclohexyl methacrylate | — | — | 20 | 10 | — |
| t-butylcyclohexyl methacrylate | — | 20 | — | — | 10 |
| t-butyl methacrylate | 10 | — | — | — | 6 |
| Stearyl methacrylate | — | 9.5 | — | 5 | 12 |
| Styrene | — | 5 | — | — | 3 |
| Butyl acrylate | — | — | 8.0 | 13.5 | 9.4 |
| Methyl methacrylate | — | — | 10.0 | — | — |
| Hydroxyethyl methacrylate | — | — | 10 | — | — |
| Hydroxyethyl acrylate | — | 10 | — | 6 | 7.2 |
| Methacrylic acid | — | 0.5 | 0.5 | 0.5 | 0.6 |
| Toluene | 35 | — | — | — | — |
| Xylene | — | 25 | 35 | 40 | 30 |
| Butyl alcohol | 15 | — | — | 10 | 20 |
| Butyl acetate | — | 25 | 15 | — | — |
| 2,2'-Azobisisobutyronitrile | — | 0.5 | 0.5 | 0.7 | — |
| Benzoyl peroxide | 0.2 | — | — | — | 0.5 |
| Dropping time (h) | 2 | 2 | 2 | 2 | 4 |
| Polymerization temperature (°C.) | 75 | 100 | 110 | 100 | 110 |
| Non-volatile matter (%) | 50 | 50 | 50 | 50 | 50 |
| Weight-average molecular weight | 150000 | 35000 | 25000 | 20000 | 10000 |
| Hydroxyl value (mg KOH/g) | — | 48 | 43 | 29 | 35 |
| Acid value (mg KOH/g) | — | 3.3 | 3.3 | 3.3 | 3.9 |

TABLE 2

| Comparative Example No. | 1 | 2 | 3 | 4 | 5 | 6 |
|---|---|---|---|---|---|---|
| Copolymer solution | (1) | (2) | (3) | (4) | (5) | (6) |
| 4-Methacryloyloxy-2,2,6,6-tetramethyl piperidine | — | — | 1.5 | — | — | — |
| 4-Methacryloyloxy-1,2,2,6,6-pentamethyl piperidine | 25 | — | — | — | 5 | — |
| Cyclohexyl methacrylate | — | 10 | — | — | — | — |
| t-butylcyclohexyl methacrylate | — | — | — | 20 | — | — |
| Styrene | 25 | 20 | 25 | 16 | 5 | 25 |
| Butyl acrylate | — | 20 | 9.5 | 11.6 | 1.0 | — |
| Ethyl acrylate | — | — | — | — | 23.5 | 20.7 |
| Hydroxyethyl methacrylate | — | — | 10 | — | — | — |
| Hydroxyethyl acrylate | — | — | — | 8 | 6 | 4 |
| Methacrylic acid | — | — | 0.5 | 0.4 | 0.5 | 0.3 |
| Toluene | 35 | 40 | — | — | — | — |
| Xylene | — | — | 35 | 30 | 25 | 35 |
| Butyl alcohol | 15 | 10 | — | — | 25 | 15 |
| Butyl acetate | — | — | 15 | 20 | — | — |
| 2,2'-Azobisisobutyronitrile | 1.0 | 2.5 | — | 1.0 | 1.0 | — |
| Benzoyl peroxide | — | 1.0 | 2.0 | — | — | 0.5 |
| Dropping time (h) | 2 | 4 | 2 | 2 | 2 | 2 |
| Polymerization temperature (°C.) | 90 | 110 | 130 | 100 | 100 | 120 |
| Non-volatile matter (%) | 50 | 50 | 50 | 50 | 50 | 50 |
| Weight-average molecular weight | 30000 | 4500 | 10000 | 18000 | 20000 | 15000 |
| Hydroxyl value (mg KOH/g) | — | — | 43 | 39 | 29 | 19 |
| Acid value (mg KOH/g) | — | — | 4.3 | 2.6 | 3.3 | 2.0 |

Example 7

In the same reaction vessel as used in Example 1 was placed 40 parts of isopropyl alcohol under a nitrogen gas stream. With the system heated to 80° C., a polymerizable monomer component composed of 3 parts of 4-methacryloyloxy-2,2,6,6-tetramethylpiperidine, 20 parts of cyclohexylmethacrylate, 10 parts of stearyl acrylate, 15 parts of butyl acrylate, 5.5 parts of methyl methacrylate, 2 parts of hydroxyethyl acrylate, and 2 parts of azobisisobutyronitrile was added dropwise over 4 hours. The system was kept at 80° C. for 4 hours. The reaction product was neutralized with 6.3 parts of triethylamine. Thus there was obtained a solution containing 60.1% of non-volatile matter or the copolymer of the present invention which has a weight-average molecular weight of 15,000. This solution is designated as the copolymer solution (7). Example 7 and Comparative Examples 7 and 8

The same procedure as in Example 7 was repeated to prepare copolymer solution (8) and comparative copolymer solutions (7) and (8), except that the polymerizable monomer, solvent, polymerization initiator, and polymerization temperature were changed as shown in Table 3.

TABLE 3

| Example No. | Example 8 | Comparative Example 7 | Comparative Example 8 |
|---|---|---|---|
| Copolymer solution | (8) | (7) | (8) |
| 4-Methacryloyloxy-2,2,6,6-tetramethyl piperidine | — | — | — |
| 4-Methacryloyloxy-1,2,2,6,6-pentamethyl piperidine | 10 | — | 3 |
| Cyclohexyl methacrylate | — | 10 | — |
| t-butylcyclohexyl methacrylate | 20 | — | — |
| t-butyl methacrylate | 10 | — | 20 |
| Stearyl methacrylate | — | — | 5 |
| Styrene | 5 | 20 | — |
| Butyl acrylate | 8 | 19.2 | 25 |
| Hydroxyethyl methacrylate | 2 | 5 | 2 |
| Acrylic acid | 5 | 5.5 | 5 |
| Isopropyl alcohol | 40 | 40 | 40 |
| 2,2'-Azobisisobutyronitrile | 0.4 | 1.0 | 0.4 |
| Triethylamine | 7.0 | 7.7 | 7.0 |
| Dropping time (h) | 2 | 4 | 2 |
| Polymerization temperature (°C.) | 80 | 80 | 80 |
| Non-volatile matter (%) | 60.3 | 59.8 | 60.0 |
| Weight-average molecular weight | 20000 | 10000 | 20000 |

Example 9

In a 0.5-liter separable flask equipped with a stirrer, reflux condenser, dropping funnel, and thermometer were placed 134 parts of deionized water, 2 parts of "Nonipol 200" (polyoxyethylene nonylphenyl made by Sanyo Kasei Ltd.), and 0.5 parts of "Newpol PE-68" (polyoxyethylene glycol-polyoxypropylene glycol-polyoxyethyleneglycol triblock copolymer made by Sanyo Kasei Ltd.). The solution was heated to 65° C. with stirring by blowing nitrogen gas. To the flask was evenly added dropwise over 2 hours pre-emulsion mixture prepared by adding 6 parts of "Nonipol 200", 3.5 parts of "Newpol PE-68" and 18 parts of distilled water to a polymerizable monomer component composed of 64 parts of 2-ethylhexyl acrylate, 130 parts of cyclohexyl methacrylate, 4 parts of 4-methacryloyloxy-2,2,6,6-tetramethylpiperidine, and 2 parts of acrylic acid. Until the dropwise addition was complete, 10 parts of 5% aqueous solution of ammonium persulfate and 5 parts of 5% aqueous solution of hydrogen, sodium sulfite were added by portions at intervals of 10 minutes. After aging for 1 hour, the system was cooled. The reaction product was neutralized with 0.9 parts of 25% ammonia water. Thus there was obtained an aqueous dispersion (9) having a viscosity of 1500 cps and containing 50% of non-volatile matter or the copolymer of the present invention.

Example 10 and Comparative Examples 9 and 10

The same procedure as in Example 9 was repeated to give the copolymer aqueous dispersion (10) and comparative copolymer aqueous dispersions (9) and (10), except that the composition of the polymerizable monomer component was changed as shown in Table 4.

TABLE 4

| Example No. | Example 10 | Comparative Example 9 | Comparative Example 10 |
|---|---|---|---|
| Copolymer aqueous dispersion | (10) | (9) | (10) |
| 4-Methacryloyloxy-2,2,6,6-tetramethyl piperidine | — | 4 | — |
| 4-Methacryloyloxy-1,2,2,6,6-pentamethyl piperidine | 20 | — | — |
| Cyclohexyl methacrylate | — | — | 60 |
| t-butylcyclohexyl methacrylate | 60 | — | — |
| t-butyl methacrylate | 20 | — | — |
| Stearyl methacrylate | — | — | — |
| Styrene | 24 | — | 60 |
| Methyl methacrylate | — | 120 | — |
| 2-Ethylhexyl acrylate | 74 | 74 | 78 |
| Acrylic acid | 2 | 2 | 2 |
| Non-volatile matter (%) | 50 | 50 | 50 |
| Viscosity (cps) | 800 | 2000 | 1000 |

Examples 11 and 12 and Comparative Examples 11 and 12

Copolymer solutions (1) and (2) obtained in Examples 1 and 2 and comparative copolymer solutions (1) and (2) obtained in Comparative Examples 1 and 2 were made into coating compositions (1) and (2) and comparative coating compositions (1) and (2) according to the following formulation.

| Formulation | |
|---|---|
| Copolymer solution or comparative copolymer solution: | 100 parts |
| Toluene: | 33 parts |
| Butyl alcohol: | 33 parts |

The resulting coating composition was applied by spraying to a white plate which is a zinc phosphatetreated plate coated with two-pack urethane resin enamel. After drying at room temperature for 1 week, the coating film was tested for performance. The coating film was 20 μm thick. The results are shown in Table 5. It is noted that the coating film has outstanding weather resistance.

TABLE 5

| | Example 11 | Example 12 | Comparative Example 11 | Comparative Example 12 |
|---|---|---|---|---|
| Copolymer solution | (1) | (2) | Comparative (1) | Comparative (2) |
| Coating composition | (1) | (2) | Comparative (1) | Comparative (2) |
| Gloss (60°) | 99.0 | 90.0 | 96.0 | 97.0 |

TABLE 5-continued

|  | Example 11 | Example 12 | Comparative Example 11 | Comparative Example 12 |
|---|---|---|---|---|
| Buildability (visual) | Excellent | Good | Good | Good |
| W-O-M (2000 hours) |  |  |  |  |
| Gloss retention (%) | 95< | 95< | 70 | 20 |
| Discoloration resistance ΔE | 2> | 2> | 3.5 | 17.5 |
| Crack resistance | Excellent | Excellent | Poor | Poor |
| Blister resistance | Excellent | Excellent | Poor | Poor |

Examples 13 and 14 and Comparative Examples 13 and 14

Copolymer solutions (1) and (2) obtained in Examples 3 and 4 and comparative copolymer solutions (1) and (2) obtained in Comparative Examples 3 and 4 were made into coating compositions (3) and (4) and comparative coating compositions (3) and (4) according to the following formulation.

| Formulation | |
|---|---|
| Copolymer solution or comparative copolymer solution: | 100 parts |
| "Sumidule N":* | 20-22 parts |
| Xylene: | 12-14 parts |
| Toluene: | 10 parts |
| Ethyl acetate: | 10 parts |
| Butyl acetate: | 10 parts |

(*75% solution of hexamethylene diisocyanate made by Sumitomo Bayer Urethane Co., Ltd.)

The resulting coating composition was applied by spraying to a white plate which is a zinc phosphatetreated plate coated with two-pack urethane resin enamel. After baking at 80° C. for 30 minutes and air-drying for one day, the coating film was tested for performance. The coating film was 30 μm thick. The results are shown in Table 6. It is noted that the coating film has outstanding weather resistance.

TABLE 6

|  | Example 13 | Example 14 | Comparative Example 13 | Comparative Example 14 |
|---|---|---|---|---|
| Copolymer solution | (3) | (4) | Comparative (3) | Comparative (4) |
| Coating composition | (3) | (4) | Comparative (3) | Comparative (4) |
| Gloss (60°) | 98.0 | 97.5 | 90 | 94 |
| Buildability (visual) | Excellent | Excellent | Good | Excellent |
| W-O-M (2000 hours) |  |  |  |  |
| Gloss retention (%) | 95< | 95< | 35 | 15 |
| Discoloration resistance ΔE | 3 | 2> | 6.6 | 12.0 |
| Crack resistance | Excellent | Excellent | Poor | Poor |
| Blister resistance | Excellent | Excellent | Poor | Poor |
| Solvent resistance* | Excellent | Excellent | Excellent | Excellent |

*Surface state observed after rubbing (100 times) with a cloth moistened with xylene.

Example 15 and Comparative Example 15

Copolymer solution (4) obtained in Example 4 and comparative copolymer solution (4) obtained in Comparative Example 4 were made into coating compositions (5) and comparative coating compositions (5) according to the following formulation.

| Formulation | |
|---|---|
| Copolymer solution or comparative copolymer solution: | 100 parts |
| CR-95:* | 43 parts |
| Xylene: | 16 parts |
| Butyl acetate: | 10 parts |
| Glass beads (3 mm in dia.): (mixed by a paint shaker for 60 min to give a white base.) | 100 parts |
| "Sumidule N":** | 20 parts |
| Xylene: | 14 parts |
| Toluene: | 20 parts |
| Ethyl acetate: | 20 parts |
| Butyl acetate: | 27 parts |

(*Rutile-type titanium oxide, made by Ishihara Sangyo Co., Ltd.)
(**75% solution of hexamethylene diisocyanate made by sumitomo Bayer Urethane Co., Ltd.)

The resulting coating composition was applied by spraying to a zinc phosphate-treated plate. After baking at 80° C. for 30 minutes and air-drying foe one day, the coating film was tested for performance. The coating film was 40 μm thick. The results are shown in Table 7. It is noted that the coating film has outstanding weather resistance.

TABLE 7

|  | Example 15 | Comparative Example 15 |
|---|---|---|
| Copolymer solution | (4) | Comparative (4) |
| Coating composition | (5) | Comparative (5) |
| Gloss (60°) | 94 | 93 |
| Buildability (visual) | Excellent | Excellent |
| W-O-M (2000 hours) |  |  |
| Gloss retention (%) | 95< | 20 |
| Discoloration resistance ΔE | 2> | 7.5 |
| Crack resistance | Excellent | Excellent |
| Blister resistance | Excellent | Excellent |
| Solvent resistance (xylene) | Excellent | Excellent |

Examples 16 and 17 and Comparative Examples 16 and 17

Copolymer solutions (5) and (6) obtained in Examples 5 and 6 and comparative copolymer solutions (5) and (6) obtained in Comparative Examples 5 and 6 were made into thermosetting coating compositions (6) and (7) and comparative thermosetting coating compositions (6) and (7) according to the following formulation.

| Formulation | |
|---|---|
| Copolymer solution or comparative copolymer solution: | 100 parts |
| "Superbekkamin 47-508-60":* | 27.8 parts |
| Xylene: | 19.5 parts |
| Butyl alcohol: | 19.5 parts |

(*60% solution of butylated melamine resin made by Dainippon Ink & Chemicals, Inc.)

The resulting coating composition was applied by spraying to a white plate which is a zinc phosphatetreated plate coated with two-pack urethane resin enamel. After baking at 160° C. for 20 minutes, the coating film was tested for performance. The results are shown in Table 8. It is noted that the coating film has outstanding weather resistance.

TABLE 8

|  | Example 16 | Example 17 | Comparative Example 16 | Comparative Example 17 |
|---|---|---|---|---|
| Copolymer solution | (5) | (6) | Comparative (5) | Comparative (6) |
| Coating composition | (6) | (7) | Comparative (6) | Comparative (7) |
| Gloss (60°) | 91 | 92 | 86 | 90 |
| Buildability (visual) | Excellent | Excellent | Fair | Good |
| W-O-M (2000 hours) | | | | |
| Gloss retention (%) | 95< | 95< | 40 | 10 |
| Discoloration resistance ΔE | 2> | 2> | 6.2 | 22.5 |
| Crack resistance | Excellent | Excellent | Fair | Poor |
| Blister resistance | Excellent | Excellent | Poor | Poor |
| Solvent resistance (xylene) | Excellent | Excellent | Excellent | Good |

Examples 18 and 19 and Comparative Examples 18 and 19

Copolymer solutions (7) and (8) obtained in Examples 7 and 8 and comparative copolymer solutions (7) and (8) obtained in Comparative Examples 7 and 8 were made into thermosetting coating compositions (8) and (9) and comparative thermosetting coating compositions (8) and (9) according to the following formulation.

| Formulation | |
|---|---|
| Copolymer solution or comparative copolymer solution: | 100 parts |
| "Sumimar M-40S":* | 25 parts |
| Isopropyl alcohol: | 40 parts |
| Butyl cellosolve | 10 parts |
| Water: | 25 parts |

(*80% solution of methylated melamine resin made by Sumitomo Chemical Industries Co., Ltd.)

The resulting coating composition was applied by spraying to a white plate which is a zinc phosphatetreated plate coated with two-pack urethane resin enamel. After baking at 140° C. for 20 minutes, the coating film was tested for performance. The results are shown in Table 9. It is noted that the coating film has outstanding weather resistance.

TABLE 9

|  | Example 18 | Example 19 | Comparative Example 18 | Comparative Example 19 |
|---|---|---|---|---|
| Copolymer solution | (7) | (8) | Comparative (7) | Comparative (8) |
| Coating composition | (8) | (9) | Comparative (8) | Comparative (9) |
| Gloss (60°) | 97.5 | 96.0 | 96.0 | 92.0 |
| Buildability (visual) | Excellent | Excellent | Excellent | Fair |
| W-O-M (2000 hours) | | | | |
| Gloss retention (%) | 95< | 95< | 20 | 23 |
| Discoloration resistance ΔE | 1> | 1> | 15.5 | 4.5 |
| Crack resistance | Excellent | Excellent | Poor | Poor |
| Blister resistance | Excellent | Excellent | Poor | Poor |
| Solvent resistance (xylene) | Excellent | Excellent | Excellent | Excellent |

Examples 20 and 21 and Comparative Examples 20 and 21

Copolymer aqueous dispersions (9) and (10) obtained in Examples 9 and 10 and comparative copolymer aqueous dispersions (9) and (10) obtained in Comparative Examples 9 and 10 were made into coating compositions (10) and (11) and comparative coating compositions (10) and (11) according to the following formulation.

| Formulation | |
|---|---|
| Copolymer dispersion or comparative copolymer dispersion: | 100 parts |
| Texanol: | 4 parts |

The resulting coating composition was applied using a 4-mil doctor blade to a white plate which is a zinc phosphate-treated plate coated with two-pack urethane resin enamel. After drying at 25° C. for 1 week, the coating film was tested for performance. The results are shown in Table 10. It is noted that the coating film has outstanding weather resistance.

TABLE 10

| | Example 20 | Example 21 | Comparative Example 20 | Comparative Example 21 |
|---|---|---|---|---|
| Copolymer solution | (9) | (10) | Comparative (9) | Comparative (10) |
| Coating composition | (10) | (11) | Comparative (10) | Comparative (11) |
| Gloss (60°) | 88.5 | 86.0 | 81 | 88 |
| Buildability (visual) | Excellent | Excellent | Poor | Excellent |
| W-O-M (2000 hours) | | | | |
| Gloss retention (%) | 95< | 95< | 70 | 40 |
| Discoloration resistance ΔE | 1> | 1> | 2.5 | 13.5 |
| Crack resistance | Excellent | Excellent | Fair | Poor |
| Blister resistance | Excellent | Excellent | Fair | Poor |

What is claimed is:

1. An ultraviolet-stable copolymer which is obtained by copolymerizing a polymerizable monomer mixture comprising 0.1 to 95.0% by weight of an ultraviolet-stable polymerizable monomer (a) represented by the formula (I):

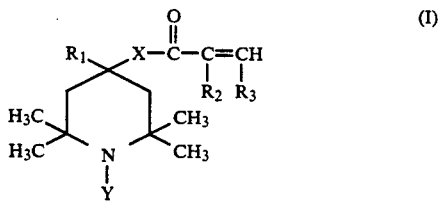

(I)

wherein $R_1$ denotes a hydrogen atom or cyano group; $R_2$ and $R_3$ each independently denotes a hydrogen atom or an alkyl group having 1 to 2 carbon atoms; X denotes an imino group or an oxygen atom; and Y denotes a hydrogen atom or an alkyl group having 1 to 18 carbon atoms, and 5.0 to 99.0% by weight of a cycloalkyl group-containing polymerizable monomer (b) represented by the formula (II):

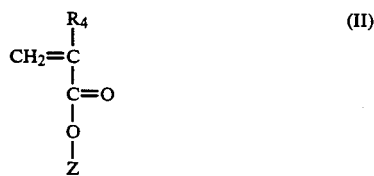

(II)

wherein $R_4$ denotes a hydrogen atom or an alkyl group having 1 to 2 carbon atoms and Z denotes a $C_5$–$C_{12}$ cycloalkyl group which may have a substituent group, wherein said substituent group is a $C_1$–$C_4$ alkyl group.

2. The copolymer as claimed in claim 1 comprising two kinds of groups (—A—) and (—B—) connected to each other in an arbitrary order, (—A—) represented by formula (III):

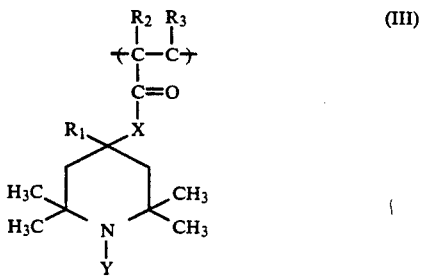

(III)

wherein $R_1$, $R_2$, $R_3$, X and Y are defined as in formula (I) of claim 1, and (—B—) represented by formula (IV):

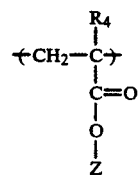

(IV)

wherein $R_4$ and Z are defined as in formula (II) of claim 1.

3. The copolymer as claimed in claim 1 which is obtained from the polymerizable monomer mixture comprising, in addition to the ultraviolet-stable polymerizable monomer (a) and the cycloalkyl group-containing polymerizable monomer (b), one or more polymerizable monomer (c) selected from the group consisting of tert-butyl (meth)acrylate and stearyl (meth)acrylate.

4. The copolymer as claimed in claim 1 wherein the cycloalkyl group-containing monomer (b) is cyclohexyl (meth)acrylate or tert-butycyclohexyl (meth)acrylate.

5. The copolymer as claimed in claim 3 wherein the polymerizable monomer (c) is a hydroxyl group-containing monomer which is used in such an amount that the resulting copolymer has a hydroxyl value of 0.1 to 200 mg KOH/g.

6. The copolymer as claimed in claim 3 wherein the polymerizable monomer (c) is an acid functional group-containing monomer which is used in such an amount that the resulting copolymer has an acid value of 0.1 to 100 mg KOH/g.

7. A process for producing a copolymer of copolymerizing a polymerizable monomer mixture comprising:

0.1 to 95.0% by weight of an ultraviolet-stable polymerizable monomer (a) represented by the formula (I):

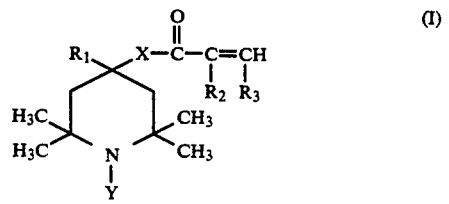

(I)

wherein $R_1$ denotes a hydrogen atom or cyano group; $R_2$ and $R_3$ each independently denotes a hydrogen atom or an alkyl group having 1 to 2 carbon atoms; X denotes an imino group or an oxygen atom; and Y denotes a hydrogen atom or an alkyl group having 1 to 18 carbon atoms, and 5.0 to 99.0% by weight of a cycloalkyl group-containing polymerizable monomer (b) represented by the formula:

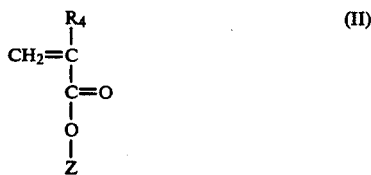

(II)

wherein $R_4$ denotes a hydrogen atom or alkyl group having 1 to 2 carbon atoms and Z denotes a $C_5$-$C_{12}$ cycloalkyl group which may have a substituent group, wherein said substituent group is a $C_1$-$C_4$ alkyl group.

8. The process for producing a copolymer as claimed in claim 7 wherein the polymerizable monomer mixture contains, in addition to the ultraviolet-stable polymerizable monomer (a) and the cycloalkyl group-containing polymerizable monomer (b), one or more polymerizable monomer (c) selected from the group consisting of tert-butyl (meth)acrylate and stearyl (meth)acrylate.

9. The process for producing a copolymer as claimed in claim 7, wherein the cycloalkyl group-containing monomer (b) is cyclohexyl (meth)acrylate or tert-butylcyclohexyl (meth)acrylate.

10. The process for producing a copolymer as claimed in claim 8, wherein the polymerizable monomer (c) is a hydroxyl group-containing monomer which is used in such an amount that the resulting copolymer has a hydroxyl value of 0.1 to 200 mg KOH/g.

11. The process for producing a copolymer as claimed in claim 8 wherein the polymerizable monomer (c) is an acid functional group-containing monomer which is used in such an amount that the resulting copolymer has an acid value of 0.1 to 100 mg KOH/g.

12. A coating composition which comprises the copolymer claimed in claim 1 and a solvent for dissolution or dispersion.

13. The coating composition as claimed in claim 12 wherein the solvent is used in an amount of 40 to 235 parts by weight per 100 parts by weight of the copolymer.

14. A curable coating composition comprising the copolymer claimed in claim 5, a crosslinking agent, and a solvent for dissolution or dispersion.

15. The curable coating composition as claimed in claim 14, wherein the crosslinking agent is a polyisocyanate or a modified product thereof.

16. The curable coating composition as claimed in claim 15, wherein the polyisocyanate or the modified product thereof is used in an amount of 5 to 100 parts by weight per 100 parts by weight of the copolymer.

17. The curable coating composition as claimed in claim 14, wherein the crosslinking agent is an aminoplast resin.

18. The curable coating composition as claimed in claim 17, wherein the aminoplast resin is used in an amount of 5 to 70 parts by weight per 100 parts by weight of the copolymer.

* * * * *